United States Patent Office 3,337,632
Patented Aug. 22, 1967

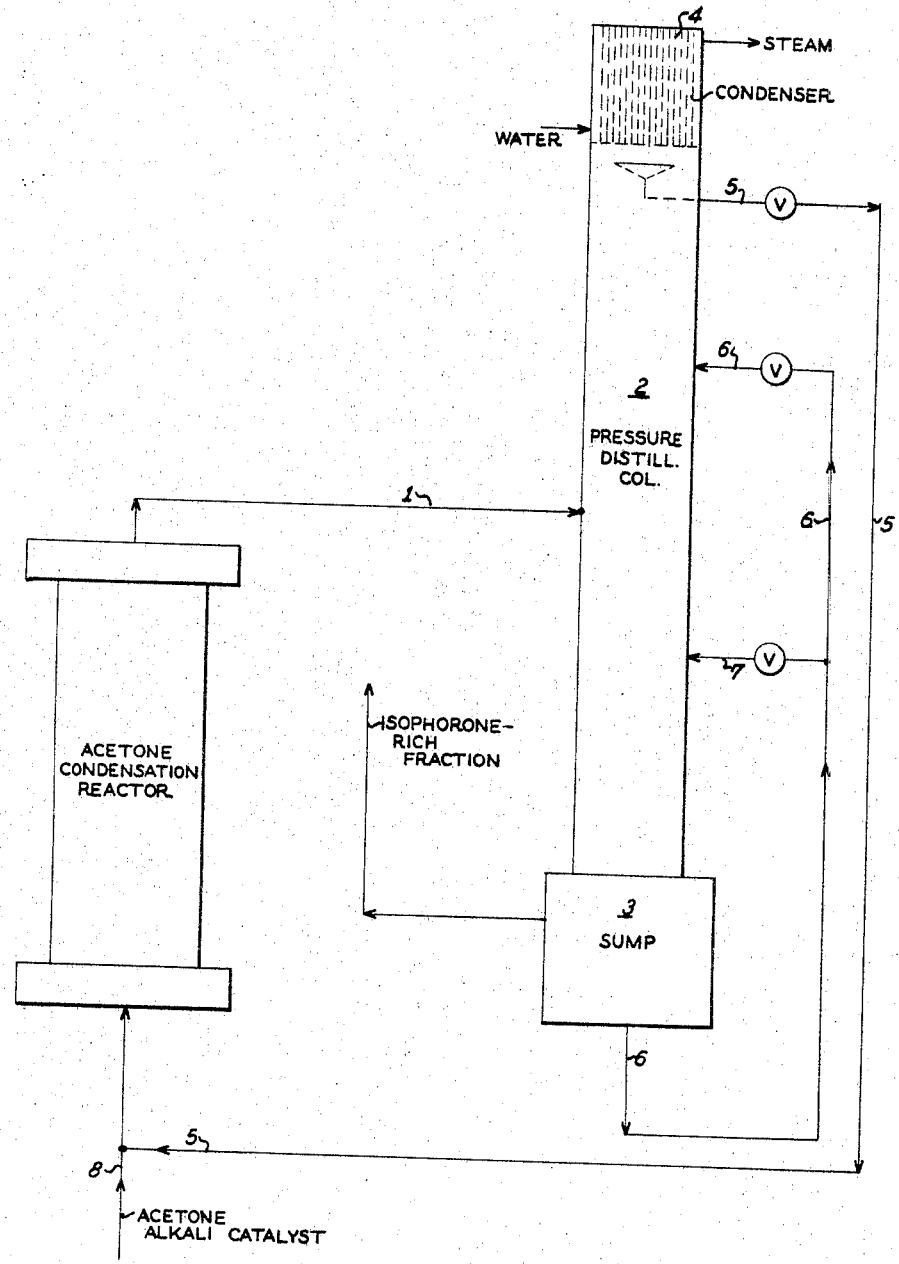

3,337,632
PROCESS FOR RECOVERING ISOPHORONE IN HIGH PURITY
Karl Schmitt, Herne, Westphalia, and Josef Disteldorf, Wanne-Eickel, Germany, and Wolfgang Baron, deceased, late of Bochum, Germany, by Gunhild Baron, nee Mayer, legal representative, Marburg (Lahn), Germany, assignors to Hibernia-Chemie, G.m.b.H., Gelsenkirchen-Buer, Germany, a corporation of Germany
Filed Dec. 18, 1961, Ser. No. 160,358
Claims priority, application Germany, Dec. 23, 1960, B 60,626
16 Claims. (Cl. 260—586)

The present invention relates to a process for recovering isophorone, and more particularly to such a process for recovering isophorone in high purity from the organic reaction mixture obtained from the condensation of acetone to isophorone.

It is known that a series of side reactions occur during the condensation of acetone to isophorone, which side reactions considerably adversely affect the quantity and quality of the over-all condensation. As a result of these side reactions, mesityl oxide and overcondensates occur in considerable quantities in the acetone-condensation product reaction mixture. Therefore, attempts have been made to recover these by-products for use in some form, so that the over-all condensation will be rendered more economical. In addition to the foregoing by-products, compounds such as, for example, phorone, beta-isophorone and xylitones, are also formed during the acetone condensation reaction. While the latter compounds are concededly less important with respect to their quantity in the reaction mixture, their presence is detrimental to the customary subsequent work-up of the reaction mixture to recover isophorone. In this connection, during the usual distillation which follows the condensation, phorone, beta-isophorone, and xylitones can only be separated from the desired isophorone to a partial extent, and then only under uneconomical conditions. The foregoing by-products, and especially phorone, beta-isophorone, and xylitones, produce changes in the make up of the isophorone product obtained, particularly as a result of decompositions in the technical isophorone product which occur during the course of time. Such decompositions produce discolorations, acid formation by way of oxidative decomposition, etc., whereby the quality of the isophorone product is considerably decreased, and its utilization as a solvent or as a pure starting material for various syntheses is impaired. Accordingly, a practical answer to the question of how to remove the objectionable by-products which occur in significant amounts from the acetone-condensation products, in order to obtain isophorone of higher purity and again utilizable materials would find wide commercial acceptance.

One conventional method for working up the condensation products of acetone employs a liquid phase treatment of the condensation products with an aqueous alkali solution of 0.5 to 25% concentration at a temperature between 130 and 235 degrees C. In this manner, however, comparatively insufficient yields of reusable substances are obtained. This is due to the fact that the acetone formed from the hydrolytic cleavage of the by-products recondenses at least in part to xylitones in the reaction mixture including isophorone, whereby such xylitones, in turn, once more manifest the usual difficulties in the work up to pure isophorone, and lead to later objectionable decompositions in the technical isophorone product upon standing. The liquid phase alkali treatment of the acetone-condensation products possesses the further disadvantage that it may be applied only with respect to reaction products which contain no more than 10% isophorone and which are free from by-products having a boiling point lower than that of xylitone.

According to a further conventional process, isophorone reaction mixtures may be purified where the same are contaminated with only slight amounts of impurities. Specifically, the acetone-condensation product reaction mixture is treated in liquid phase with fuller's earth and/or acid agents, such as for example toluene sulfonic acid, in order to convert the slight impurities precent to innocuous form. Nevertheless, just as in the case with the former conventional process, this conventional process has not found wide application since the results achieved are not economically significant.

A further technique for working up the acetone-condensation reaction mixture contemplates the removal of unreacted acetone from the reaction mixture by distillation thereof at normal pressure, and thereafter the recovery of the end product by subsequent distillation steps. In this regard, once the unreacted acetone has been removed, the reaction mixture is subjected to vacuum distillation in a series of after-connected columns for the successive removal of the more easily volatile substances present. The number of after-connected columns will depend upon the number of substances present in the isophorone-containing reaction mixture which must be removed as well as the degree of purity desired for the isophorone product. Usually, about 4 to 6 series-connected distillation columns are required for removal of the objectionable by-products present in the acetone-condensation reaction mixture so that a reasonably pure isophorone product may be recovered.

It is obvious from the fact that a plural number of steps involving at least 4 to 6 distillation columns must be used that an unfavorable relationship exists between the acetone condensation to form isophorone and the subsequent work up of the reaction mixture, the subsequent work up requiring a disproportionately high technical and economical expenditure. Moreover, still further significant disadvantages are apparent. In this connection, it is clear that the greatest proportion of the energy and apparatus requirements are attributable to the distillation step employed for recovering acetone from the condensation reaction mixture. Considering the number of successive distillation steps required to obtain a reasonably pure isophorone product as well as the amount of reflux necessary for the normal distillation to remove acetone from the condensation reaction mixture, it will be evident that in a normal pressure acetone distillation column, acetone will have to be driven off in an amount of about 20 times the amount of condensation reaction product present. Moreover, the heat of condensation of the quantities of acetone drawn off overhead during the distillation can in no way be recovered readily and completely, and in fact extraneous cooling is even applied to condense the distilled acetone vapors. Once the acetone vapors are condensed, the liquid acetone is then recycled to the acetone condensation reaction to form further isophorone, wherein added energy is required for increasing the temperature and pressure of such acetone to achieve the proper reaction state for conversion to isophorone. Besides, the additional energy requirements, supplemental apparatus arrangements are required, such as pumps, heat exchangers, etc. in order to enable the recycled acetone to be effectively reacted to produce once more the isophorone-containing reaction mixture with the desired ratio of constituents therein, i.e. isophorone, unreacted acetone, etc.

Various conventional methods are known whereby acetone may be condensed to form the desired isophorone. For instance, in accordance with one method, acetone in vapor phase or in liquid phase may be condensed over solid catalysts. These methods employing solid catalysts, however, possess considerable disadvantages and therefore are not widely employed. A more favorable method consists in employing the catalyst in liquid form, such as for example, as an aqueous solution. In this connection, acetone in liquid phase is reacted in the presence of the aqueous catalyst under known conditions of temperature and pressure, usually with agitation of the ingredients. Agitation is often employed due to the fact that a primary 2-phase state of the starting materials exists on account of the limited solubility of acetone in the aqueous catalyst phase.

A particularly favorable technique for carrying out the solution-condensation of acetone may be achieved in a reaction mixture representing a homogeneous phase at least preliminarily. This is realized by the addition of very slight quantities of alkali (NaOH, KOH, etc.), for example up to about 0.1% of alkali based upon the total liquid present, using a solvent medium such as water, alcohol, etc. Proceeding from a mixture of 80% by volume of acetone and 20% by volume of water, containing 0.04% by weight of alkali based upon the total quantity of acetone and water in the mixture, the solution-condensation will lead to a reaction product perhaps having a composition by volume of 70% acetone, 19% water, 6% isophorone, 2% over-condensates, 1.9% mesityl oxide, and slight quantities of other constituents, such as phorone, beta-isophorone, etc. Such a reaction mixture will be obtained usually if the solution-condensation reaction is carried out at comparatively low temperatures whereby the formation of unduly large amounts of higher condensates and condensates not directly usable in the form obtained will be avoided.

It is an object of the present invention to overcome the foregoing drawbacks and to provide a process for obtaining usable products from the condensation by-products of acetone and specifically to a process for recovering isophorone in high purity from the isophorone-containing acetone-condensation reaction mixture obtained from the condensation of acetone to isophorone in liquid phase.

It is a further object of the invention to provide for the distillation of acetone from the acetone-condensation reaction mixture under a positive pressure whereby the pressure conditions in the acetone distillation and the acetone condensation reaction to form isophorone are closely linked together.

Other and further objects of the invention will become apparent from a study of the within specification and accompanying drawing, in which the figure illustrates schematically an acetone condensation reactor connected with a subsequent distillation column for treating the organic reaction mixture obtained from the condensation of acetone to isophorone in the reactor, in accordance with the present invention.

It has been found in accordance with the present invention that a process for recovering isophorone in high purity from the isophorone-containing organic reaction mixture obtained from the condensation of acetone to form isophorone may be provided, which comprises distilling acetone from the organic reaction mixture at a positive pressure sufficient to permit the liquid condensation of distilled acetone at a temperature above about 100 degrees C., continuously removing the acetone being distilled and condensing the distilled acetone to liquid form at said temperature of about 100 degrees C., and recovering isophorone from the remaining organic reaction mixture. Suitably, the isophorone which is recovered is subjected to a further distillation step at decreased pressure to obtain an isophorone reaction of highest purity.

The organic reaction mixture preferably contains dilute aqueous alkali in a concentration between about 0.04 and 0.1% by weight based upon the total quantity of liquids in the reaction mixture.

In accordance with a preferred embodiment of the invention, the positive pressure should be sufficient to permit the condensation of distilled acetone to take place at a temperature at least about 200 degrees C. In the usual case, the distillation pressure will range between about 10–30 atmospheres gauge and the temperature will range between about 140–235 degrees C. Preferably, the heat of condensation upon condensing the distilled acetone to liquid form is recovered and applied in the distillation by heat exchange means while the distilled acetone condensed to liquid form is suitably recovered for recycling to the acetone condensation reaction for forming further isophorone. One feature of the invention, moreover, contemplates recycling at least a portion of the aqueous alkali present in the organic reaction mixture which remains upon distillation of acetone therefrom, as reflux for the distillation.

Broadly, acetone may be condensed to isophorone in liquid phase in the presence of aqueous alkali and the organic reaction mixture obtained from the acetone condensation may be passed in liquid phase and at the condensation reaction pressure into a distillation zone at a point intermediate the head and sump of the distillation zone so that acetone may be distilled from the organic reaction mixture at a positive pressure sufficient to permit the condensation to liquid form of distilled acetone at a temperature above about 100 degrees C. The acetone being distilled is thus continuousyl condensed in the head of the zone at said temperature above about 100 degrees C., thereafter recovered and recycled at said positive pressure to the acetone condensation reaction to form further isophorone. The remaining organic reaction mixture in the distillation zone upon the distilling off of acetone, forms an upper organic phase and a lower aqueous phase in the sump of the distillation zone. Conveniently, at least a portion of the aqueous alkali in the lower aqueous phase may be recycled to a point in the distillation zone intermediate the head of the zone and the point at which the organic reaction mixture is passed into the zone, while the isophorone may be recovered from the upper organic phase in the sump of said zone. An important feature of the invention contemplates maintaining the positive pressure in a distilling zone and that in the acetone condensation reaction for forming isophorone substantially equal with respect to one another.

The present invention, therefore, represents an improvement in the process for the production of isophorone in high purity by pressure condensation of acetone in liquid phase in the presence of aqueous alkali to form isophorone and subsequent distillation of the isophorone-containing acetone condensation reaction mixtuer to recover isophorone in high purity as a sump product, which comprises carrying out at the same positive pressure the acetone condensation reaction in liquid phase in a reaction zone and the subsequent distillation in a distillation zone having a head and a sump. The acetone condensation reaction mixture formed in the reaction zone is passed at the positive pressure to the distillation zone at a point intermediate the head and sump of the distillation zone whereby acetone may be distilled in the distillation zone at said pressure, said pressure being a positive pressure at which the distilled acetone condenses to liquid form in the head of the zone at a temperature above about 100 degrees C. The acetone which has been distilled and condensed to liquid form is recovered from the head of the distillation zone and advantageously recycled at said positive pressure to the reaction zone for further reaction with aqueous alkali in liquid phase at said pressure, Thus, the remaining acetone condensation reaction mixture in the distillation zone upon said distilling forms an upper isophorone-rich organic phase and a lower aqueous alkali phase in the sump of the zone, whereby conveniently at least a portion of the aqueous alkali may be recycled from the lower aqueous phase to a point in the distillation zone intermediate the head of the zone and the point at which the acetone condensation reaction product is passed into the zone, while an isophorone-rich fraction may be effectively recovered from the upper organic phase of the sump.

Significantly, by maintaining the pressure in the distillation zone such that the acetone will liquify at a temperature above about 100 degrees C. and preferably at least about 200 degrees C., a pressure range corresponding to that employed in the acetone condensation to isophorone will be attained, i.e. up to about 30 atmospheres excess pressure. Inasmuch as the pressure is preferably the same in both the reaction zone and the distillation zone, advantageously, the energy required to heat the sump in the distillation may be completely recovered in the head of the distillation column, either by providing the head condenser as steam generator or by otherwise providing heat exchange means sufficient to conserve the heat of condensation and apply it to the heating of the sump. Where the same pressure is used in the condensation reaction to form isophorone and in the distillation step, a further advantage is achieved in that pumps, heat exchangers, etc. for recycling the acetone from the distillation zone to the reaction zone may be omitted.

By means of such a linkage between the pressure distillation and the acetone condensation reaction to form isophorone an advantageous true solution-condensation is possible with the consequence that simple flow conditions and reaction conditions obtain. Specifically, only very small quantities of alkali are needed, i.e. up to 0.1% by weight based upon the total liquid content, and preferably smaller amounts, and additionally simple improvement of the solubility conditions may be effected by employing for the alkali medium an alcohol, such as methanol, ethanol, etc. instead of or in addition to water. Finally, important technological simplifications prevail due to the omission of intermediate pumps, heat exchangers, etc. in the pressure linkage arrangement.

In accordance with a specific embodiment of the invention, an acetone condensation reaction product of the customary type obtained in the conventional condensation reaction and having the composition by volume of, for example, 70% acetone, 19% water, 6% isophorone, 2% over-condensates, and 1.9% mesityl oxide, may be distilled in a pressure distillation column at a pressure of 10 atmospheres excess pressure (gauge pressure), whereby the temperature in the head of the column will be maintained around 145 degrees C. while the temperature in the sump of the column will be maintained at about 182 degrees C. Of course, the sump will consist of an aqueous phase and an organic phase, the organic phase containing the acetone-free condensation products of the reaction mixture. By such a procedure, the temperature maintained in the head of the column, which temperature is essentially determined by the vapor pressure of acetone, may be utilized profitably, by reason of suitable heat exchange means for recovering the heat of condensation of the acetone for heating the sump of the column.

Referring to the drawing, an acetone condensation reactor is conveniently linked with a distillation column such that a pressure of 30 atmospheres excess pressure is maintained in each. Therefore, in the reactor, the acetone conversion takes place under optimum conditions at a temperature of from about 200–235 degrees C., the reaction product therefrom being conducted through line 1 to the pressure distillation column 2. Suitable decomposition of the acetone condensation reaction mixture takes place in column 2 whereby for the most part acetone and the higher boiling constituents are formed in addition to the isophorone remaining in the reaction mixture. Due to the reaction conditions, acetone is distilled from the reaction mixture in column 2 under a reflux ratio of acetone of about 1. In this manner, a temperature of about 205 degrees C., corresponding to the vapor pressure of acetone under the reaction conditions, is maintained in the condenser head 4 of column 2 while a temperature of about 235 degrees C., corresponding to the vapor pressure of the water present, is maintained in the sump 3 of column 2 (i.e., with the pressure being autogenous at the temperature used). The sump 3 contains two liquid phases, i.e. an upper organic phase, representing isophorone for the most part and a lower aqueous phase, representing the aqueous alkali catalyst. The energy required for the distillation, which must be supplied to the sump 3 by indirect head exchange may be immediately and completely recovered by suitable development of the condenser head 4. In this connection, the heat of condensation of the acetone in head 4 is recovered by indirect heat exchange through the conversion of cooling water to steam, such steam supplying heat to the sump 3 either directly or indirectly. The acetone which distills from the top of column 2 and which is collected as liquid condensate in the upper portion of the column is recycled via line 5 and line 8 (through which acetone and alkali catalyst make up is achieved) back to the acetone condensation reactor for further conversion to isophorone. The acetone which is passed through line 5, of course, due to the azeotropic conditions prevalent actually contains between 10–20% of wtaer. Because of the advantageous pressure and temperature conditions maintained in the reactor and distillation column linkage, the condensed acetone liquid passing through line 5 may be recycled to the reactor directly without the need for additional heat or pump means.

Certain specific measures may be taken to implement the furtherance of secondary reactions superimposed upon the pure pressure distillation and operating independently thereof, whereby a particularly favorable influence upon the final composition and quality of the sump product will be attained. Consequently, an essential simplification of the final work-up steps will be obtained, such that a lesser number of subsequent distillation stages will be necessary in order to obtain isophorone of highest purity. As is appreciated, in the sump of the pressure column where an extensive removal of acetone has been attained already, a partial-to-complete decomposition and/or reforming takes place of those compounds which either burden the further work up or even serve to decrease the quality of the end product, such decomposition or reforming being achieved through the intimate contact of the two phases in the sump by reason of the active presence of alkali catalyst.

The alkali catalyst and/or the concentration of the aqueous catalyst necessary for the process may be increased in effect, in accordance with a preferred feature of the invention, by partially or completely returning the aqueous phase of the sump through lines 6 and 7 into the upper portion of the column, if necessary or desired under the addition of fresh alkali to line 6. Notably, the alkali returned from the aqueous phase of the sump through line 6 enters column 2 at a point below that at which the condensed liquid acetone is removed from the column through line 5, yet above the point where the condensation reaction mixture is added to the column through line 1. Under these conditions, a distillation is carried out wherein a complete cleavage of mesityl oxide into acetone is achieved even without the return of alkali through line 6, such mesityl oxide, now in the form of acetone, being continuously removed from the column by distillation so that it is possible in the further work up of the organic phase sump product to omit an afterconnected mesityl oxide distillation column. Additionally, the xylitones which gather in the sump organic phase with the isophorone, and which are distillation-wise closely associated wtih isophorone, are more or less decomposed, i.e. converted into acetone, on the one hand, and isophorone on the other, according to the particular alkali conditions prevailing in the aqueous alkali phase. Therefore, besides obtaining an additional amount of isophorone and/or reusable acetone by reforming and cleavage reactions, considerable simplification in the subsequent work up of the isophorone fraction obtained is rendered possible, and also the recovery of an isophorone fraction of markedly better quality than was heretofore the case.

The subsequent work up of the isophorone fraction recovered from the organic phase of the sump may be carried out in the conventional manner in a subsequent distillation stage, preferably under decreased pressure. In consequence of the foregoing, a very pure isophorone product may be obtained.

The following example is set forth for the purpose of illustrating the invention, and it will be understood that the invention is not to be limited thereby.

*Example*

Employing an arrangement such as that shown in the drawing, a distillation column for treatment of the acetone condensation reaction mixture was used capable of withstanding up to 50 atmospheres excess pressure, and having a length 8 meters and an inner diameter of 100 millimeters. The distillation column was filled throughout with saddle-bodies (8 mm.). The acetone condensation mixture which was passed through line 2 to the distillation column was obtained in the following manner. A pressure tight reaction vessel (volume 110 liter) is charged with 80 kilograms acetone per hour and 20 kilograms water per hour. This mixture which is preheated before entering the condensation reaction vessel contains 0.03% by weight of NaOH based upon the total liquid quantity. The temperature of the reaction space is held at 205° C., the pressure at 30 atmospheres, so that a liquid reaction phase is maintained. The mixture withdrawn from the reaction vessel after a reaction time of 40 minutes contains about 70% by weight acetone, 19% by volume water, 6% by volume isophorone, 2% by volume over-condensates, 1.8% by volume mesityl oxide, 0.1% by volume phorone and 0.1% by volume β-isophorone. 20 liters per hour of this acetone condensation reaction mixture were in a continuous manner fed to the distillation column. Under an operation pressure of about 30 atmospheres absolute (corresponding to a temperature of 205° C. at the head and 235° C. at the sump of the column) in the distillation column and a reflux ratio of 1, a sump product was obtained which was completely free from mesityl oxide and in which about 40% of the disturbing xylitones were decomposed. Those results were achieved without reintroducing any alkali from the equeous phase of the sump back to an intermediate point in the column. Where the alkali phase (containing 0.15% NaOH by weight) was reintroduced into the column at a point below the head of the column and above the point at which the acetone condensation reaction mixture is introduced into the column (upper entrance of line 6), at a rate of 10 liters per hour, about 75% of the xylitones, the total quantity of phorone and the greater part of β-isophorone are decomposed.

In the stationary status there are obtained in the sump of the column 1.3 liters per hour of organic phase, which contains the isophorone, small parts of water, and the highest boiling overcondensates. The organic phase is distilled in an after connected distillation system composed of two columns. These columns have a length of 6 meters and an inner diameter of 80 millimeters. They are filled throughout with 8 millimeter-Berl-saddles. Both columns are under a vacuum of 100 millimeters. In the first column are withdrawn all products of a lower boiling point than isophorone (water, residues of β-isophorone), and in the second main-column the sump product of the first column is separated in no longer hydrolyzable over-condensates and a very pure isophorone. In the first column is maintained a reflux ratio of R=3:1, the temperatures being 72° C. in the head and 135° C. in the sump, and in the second column the reflux ratio is R=5:1, the temperatures being 132° C. in the head and 195° C. in the sump. In the first column is withdrawn a quantity of about 5% by weight, based upon the product charged, and passed back to the condensation zone. At the second column a quantity of 88% by weight based of the product charged is withdrawn. This is an extremely pure isophorone (99.9%). The product is completely colorless and exhibits no discolorations whatsoever even after standing over an extended period of time.

It will be appreciated in accordance with the invention that the weight ratio of water and/or alcohol to the organic reaction mixture being distilled may vary within wide limits, i.e. from about 0.1 to 10:1.

All in all, the process of the inventon selects a combination of chemical and physical principles to circumvent reaction conditions leading to the disadvantages manifested with previous processes for the work up of acetone-condensation reaction products. Particularly effective results may be achieved by the invention leading to an enriched isophorone product, on the one hand, and reusable by-products on the other hand, as a result of the cleavage and reversion or reformation of these by-products to acetone and lower condensates. In fact, not only is the conversion of the major portion of the by-products back into usable form achieved, but also the essential removal of the comparatively small quantities of impurities, such as xylitone, etc., which although insignificant in amount, are very disturbing in the further work up of isophorone.

Depending upon the composition and reactivity of the raw acetone condensation reaction product, on the one hand, by-products possessing large molecules may be decomposed by the alkali catalyst, while, on the other hand, specific substances may be subjected to molecular reformation or rearrangement into compounds which cease to burden the distillation. Specifically, the molecular rearrangement may lead to the formation of further isophorone from specific substances which would otherwise unduly disturb the further work up and the stability and purity qualities of the isophorone product. It should be noted that while isophorone is present under the reaction conditions of the pressure distillation, on account of its particular stability, isophorone is not subject to cleavage, decomposition, or molecular rearrangement, even to a minor degree. This result is extremely surprising in view of the reaction conditions, and may be explained, or at least be traced to the distillation of acetone which forms or which is present in the reaction mixture, under the positive pressure employed.

A great advantage of the process is found in the low concentration as well as the low consumption of the alkali hydroxide catalyst. In contrast to the normal quantity required for the conventional conversion of by-products in the acetone condensation reaction mixture, alkali concentrations of less than 0.1% by weight based upon the total liquids present may be employed, excellent results even being obtained with an alkali content of as little as 0.04% by weight.

While the production of mesityl oxide is of only slight utility as an end product in the condensation of acetone to form isophorone, advantageously in accordance with the invention, the relatively large amounts of mesityl oxide may be recovered for recycling to the acetone condensation after being first converted into acetone under the pressure distillation conditions.

With respect to the over-condensates which are present in the acetone condensation reaction mixture besides mesityl oxide, i.e. over-condensates having boiling temperatures substantially higher than isophorone and considerably more resistant to cleavage than mesityl oxide, the decomposition or cleavage of these over-condensates is effectively carried out, nevertheless, with the formation of acetone and isophorone. In this connection, a molecular rearrangement or isomerization takes place whereby the disturbing compounds, such as phorone, beta-isophorone, etc., are changed to isophorone.

What is claimed is:

1. In the process for producing isophorone in high purity by pressure condensation of acetone in the presence of aqueous alkali in a concentration of between about 0.04 and 0.1% by weight based on the total quantity of liquids in the reaction mixture to form isophorone and subsequent distillation of the isophorone-containing reaction mixture to recover isophorone in high purity, the improvement which comprises distilling acetone from the organic reaction mixture obtained from the pressure condensation of acetone to isophorone, which reaction mixture includes besides isophorone substantially both products having a lower boiling point than isophorone and products having a high boiling point than isophorone, at a positive pressure sufficient to permit the condensation back to liquid form of distilled acetone at a temperature above about 100 and up to 235° C., said positive pressure being autogenous at said temperature, continuously removing the acetone being distilled and condensing back to liquid form the distilled acetone at said temperature above about 100 and up to 235° C., recovering isophorone from the remaining organic reaction mixture, recovering the distilled acetone which has been condensed back to liquid form, and recycling such distilled acetone to the acetone pressure condensation reaction for forming further isophorone.

2. Improvement according to claim 1 wherein the isophorone recovered is subjected to a further distillation step at a decreased pressure to obtain an isophorone fraction of highest purity.

3. Improvement according to claim 1 wherein said pressure is sufficient to permit the condensation back to liquid form of distilled acetone at a temperature at least about 200° C.

4. Improvement according to claim 1 wherein the distillation pressure ranges between about 10 and 30 atmospheres gauge and the temperature ranges between about 140–235° C.

5. Improvement according to claim 1 wherein the latent heat of condensation upon condensing the distilled acetone is recovered by indirect heat exchange with a heat exchange medium and applied in the distillation by further indirect heat exchange of said heat exchange medium with the remaining liquids in the reaction mixture.

6. Improvement according to claim 5 wherein at least a portion of the aqueous alkali present in the remaining organic reaction mixture is recycled as reflux for the distillation.

7. Process for recovering isophorone in high purity from the isophorone-containing organic reaction mixture obtained from the condensation of acetone to isophorone in liquid phase in the presence of aqueous alkali in a concentration of at most about 0.1% by weight based on the total quantity of liquids in the reaction mixture, which comprises passing the liquid phase organic reaction mixture including besides isophorone substantially both products having a lower boiling point than isophorone and products having a higher boiling point than isophorone, obtained from the condensation and at the condensation reaction pressure, into a distillation zone at a point intermediate the head and sump of said zone, distilling acetone from such organic reaction mixture at a temperature above about 100 and up to 235 degrees C. and at a positive pressure autogenous at said temperature and sufficient to permit the condensation of distilled acetone continuously condensing in the head of the zone at said temperature above about 100 and up to 235 degrees C. the acetone being distilled, recovering the condensed acetone from the head of the zone and recycling said condensed acetone at said positive pressure to the acetone condensation reaction to form further isophorone, the remaining organic reaction mixture in the distillation zone upon said distilling forming an upper organic phase and a lower aqueous phase in the sump of said zone, recycling from the lower aqueous phase at least a portion of the aqueous alkali to a point in the distillation zone intermediate the head of the zone and the point at which organic reaction mixture is passed into said zone, and recovering isophorone from the remaining upper organic phase in the sump of said zone.

8. Process according to claim 7 wherein said positive pressure in said distilling zone and the acetone condensation reaction pressure for forming isophorone are substantially equal.

9. Process according to claim 8 wherein the amount of alkali present is maintained between about 0.04 and 0.1% by weight based on the total quantity of liquids in the reaction mixture and the pressure is sufficient to permit the condensation of distilled acetone at a temperature at least about 200 degrees C., the latent heat of condensation upon condensing the distilled acetone being recovered by indirect heat exchange with water which forms steam thereby and applied in the distillation by further indirect heat exchange of the steam formed with the liquid products in the sump of said zone.

10. Process according to claim 9 wherein at a pressure within the distillation zone of about 10 atmospheres gauge, the temperature in the head of the zone is maintained at about 140–145 degrees C. while the temperature in the sump is maintained at about 180–185 degrees C.

11. Process according to claim 9 wherein at a pressure within the distillation zone of about 30 atmospheres gauge, the temperature in the head of the zone is maintained at about 200–205 degrees C. while the temperature in the sump is maintained at about 230–235 degrees C.

12. In the process for the production of isophorone in high purity by pressure condensation of acetone in liquid phase in the presence of aqueous alkali in a concentration of at most about 0.1% by weight based on the total quantity of liquids in the reaction mixture to form isophorone and subsequent distillation of the isophorone-containing acetone condensation reaction mixture to recover isophorone in high purity as a sump product, the improvement which comprises carrying out at the same positive pressure the acetone condensation reaction in liquid phase in a reaction zone and the subsequent distillation in a distillation zone having a head and a sump, passing at said pressure the acetone condensation reaction mixture formed from the reaction zone and including besides isophorone substantially both products having a lower boiling point than isophorone and products having a higher boiling point than isophorone to the distillation zone at a point intermediate the head and sump of said distillation zone, distilling acetone in said distillation zone at said pressure, said positive pressure being a pressure at which the distilled acetone condenses in the head of said zone at a temperature above about 100 and up to 235 degrees C. and said positive pressure being autogenous at said temperature, continuously condensing in the head of said zone at said temperature above about 100 and up to 235 degrees C. the acetone being distilled, recovering the distilled and condensed acetone from the head of the zone and recycling said distilled and condensed acetone at said positive pressure to said reaction zone for further reaction with aqueous alkali in liquid phase at said pressure, the remaining acetone condensation reaction mixture in said distillation zone upon said distilling forming an upper isophorone-rich organic phase and a lower aqueous alkali phase in the sump of said zone, recycling at least a portion of the aqueous alkali from the lower aqueous phase in the sump to a point in the distillation zone intermediate the head of the zone and the point at which the acetone condensation reaction mixture is passed into said distillation zone, and recovering an isophorone-rich fraction from the upper organic phase in said sump.

13. Improvement according to claim 12 wherein a portion of the distilled acetone condensed in the head of said zone is used as reflux in said zone, said isophorone-rich fraction being subjected to a further distillation step at a decreased pressure to obtain an isophorone fraction of highest purity, the alkali being present in an amount maintained between about 0.04 and 0.1% by weight based on the total quantity of liquids present, said positive pressure being a pressure at whic hthe distilled acetone condenses in the head of said zone at a temperature above about 200 degrees C.

14. Improvement according to claim 12 wherein a portion of the distilled acetone condensed in the head of said zone is used as reflux in said zone, said isophorone-rich fraction being subjected to a further distillation step at a decreased pressure to obtain an isophorone fraction of highest purity, the alkali being present in an amount maintained between about 0.04 and 0.1% by weight based on the total quantity of liquids present, said positive pressure being maintained at about 10 atmospheres gauge while the temperature in the head of said zone is maintained at about 140–145 degrees C. and the temperature in the sump of said zone is maintained at about 180–185 degrees C.

15. Improvement according to claim 12 wherein a portion of the distilled acetone condensed in the head of said zone is used as reflux in said zone, said isophorone-rich fraction being subjected to a further distillation step at a decreased pressure to obtain an isophorone fraction of highest purity, the alkali being present in an amount maintained between about 0.04 and 0.1% by weight based on the total quantity of liquids present, said positive pressure being maintained at about 30 atmospheres gauge while the temperature in the head of said zone is maintained at about 200–205 degrees C. and the temperature in the sump of said zone is maintained at about 230–235 degrees C.

16. Improvement according to claim 12 wherein at least a portion of the water present in the aqueous alkali solution is replaced by a lower alkanol.

References Cited

UNITED STATES PATENTS

| | | | |
|---|---|---|---|
| 2,351,352 | 6/1944 | McAllister et al. | 260—586 |
| 2,419,051 | 4/1947 | Ballard et al. | 260—586 |
| 2,566,564 | 9/1951 | Highet et al. | 260—586 |

FOREIGN PATENTS

| | | |
|---|---|---|
| 733,650 | 7/1955 | Great Britain. |
| 1,095,818 | 12/1960 | Germany. |

LEON ZITVER, *Primary Examiner.*

UNITED STATES PATENT OFFICE
CERTIFICATE OF CORRECTION

Patent No. 3,337,632                                August 22, 1967

Karl Schmitt et al.

It is hereby certified that error appears in the above numbered patent requiring correction and that the said Letters Patent should read as corrected below.

Column 4, line 28, for "continuousyl" read -- continuously --; line 51, for "mixtuer" read -- mixture --; column 7, line 20, before "8" insert -- of --; line 47, for "equeous" read -- aqueous --; column 9, line 14, for "high" read -- higher --.

Signed and sealed this 1st day of October 1968.

(SEAL)
Attest:

Edward M. Fletcher, Jr.                              EDWARD J. BRENNER
Attesting Officer                                      Commissioner of Patents